(12) United States Patent
De Avila Antonini et al.

(10) Patent No.: US 12,146,435 B2
(45) Date of Patent: Nov. 19, 2024

(54) STRUCTURAL ARRANGEMENT IN A LOW-TEMPERATURE TURBOCOMPRESSOR USING OTHER POWER CONNECTIONS

(71) Applicant: Duo Engenharia Criativa Ltda, Porto Alegre (BR)

(72) Inventors: Natal De Avila Antonini, Porto Alegre (BR); Andre Schaan Casagrande, Porto Alegre (BR); Bruno Hartmann Da Silva, Porto Alegre (BR); Eduardo Donadel Basso, Porto Alegre (BR); Vitor Tumelero Valente, Porto Alegre (BR)

(73) Assignee: DUO ENGENHARIA CRIATIVA LTDA, Rs (BR)

( * ) Notice: Subject to any disclaimer, the term of this patent is extended or adjusted under 35 U.S.C. 154(b) by 0 days.

(21) Appl. No.: 17/957,754

(22) Filed: Sep. 30, 2022

(65) Prior Publication Data

US 2023/0086779 A1    Mar. 23, 2023

Related U.S. Application Data

(63) Continuation-in-part of application No. 17/586,369, filed on Jan. 27, 2022, now abandoned, which is a
(Continued)

(30) Foreign Application Priority Data

Jul. 5, 2017  (BR) .................. 10 2017 014513 1

(51) Int. Cl.
*F02B 29/04*    (2006.01)
*F02B 37/00*    (2006.01)
(Continued)

(52) U.S. Cl.
CPC ........ *F02B 37/013* (2013.01); *F02B 29/0412* (2013.01); *F02B 37/004* (2013.01);
(Continued)

(58) Field of Classification Search
CPC .......... F02B 37/10; F02B 39/04; F02B 29/04
See application file for complete search history.

(56) References Cited

U.S. PATENT DOCUMENTS 2,298,625 A    10/1942  Larrecq
2,392,622 A    1/1946   Traupel
(Continued)

FOREIGN PATENT DOCUMENTS

DE    102009031845 A1    1/2011
EP    0655550 A1         5/1995
(Continued)

OTHER PUBLICATIONS

European Patent Office; Extended European Search Report for Application No. 18827483.1; Feb. 22, 2021, 5 pages.
(Continued)

*Primary Examiner* — Ngoc T Nguyen
(74) *Attorney, Agent, or Firm* — UB Greensfelder LLP; Richard C. Himelhoch

(57) ABSTRACT

A low-temperature turbocompressor structural arrangement for an internal combustion engine for using energy that is available but unused during operation to cool the air supplied to the engine by supercharging. The temperature of the air compressed by the compressor is reduced by a cooling system and the air is then conveyed to a further turbine actuated by the intake air flow of the engine. The structural arrangement may be mounted in full or in part, and also each component may be fitted into existing systems.

17 Claims, 19 Drawing Sheets

Related U.S. Application Data continuation of application No. 16/762,797, filed as application No. PCT/BR2018/050168 on May 21, 2018, now Pat. No. 11,268,435.

(51) Int. Cl.
   *F02B 37/013* (2006.01)
   *F02B 37/10* (2006.01)
   *F02B 39/04* (2006.01)
   *F02B 39/08* (2006.01)

(52) U.S. Cl.
   CPC .............. *F02B 37/10* (2013.01); *F02B 29/04* (2013.01); *F02B 39/04* (2013.01); *F02B 39/085* (2013.01)

(56) References Cited

U.S. PATENT DOCUMENTS

| | | | |
|---|---|---|---|
| 2,703,561 | A | 3/1955 | Froehlich |
| 3,355,877 | A | 12/1967 | Chaffiotte |
| 4,010,613 | A | 3/1977 | McInerney |
| 4,062,188 | A | 12/1977 | Cutler et al. |
| 4,885,911 | A | 12/1989 | Woollenweber et al. |
| 5,259,196 | A | 11/1993 | Faulkner et al. |
| 5,269,143 | A | 12/1993 | Cikanek et al. |
| 5,442,904 | A | 8/1995 | Shnaid |
| 5,577,385 | A | 11/1996 | Kapich |
| 5,904,045 | A | 5/1999 | Kapich |
| 6,158,217 | A | 12/2000 | Wang |
| 7,779,634 | B2 * | 8/2010 | Barthelet ............... F02B 37/14 60/605.1 |
| 8,176,736 | B2 | 5/2012 | Janssen |
| 8,726,657 | B2 | 5/2014 | Hunter |
| 8,943,823 | B2 | 2/2015 | Fiveland |
| 9,115,639 | B2 | 8/2015 | Petrovic et al. |
| 9,115,644 | B2 | 8/2015 | Bauer et al. |
| 9,243,548 | B2 | 1/2016 | Klingbeil et al. |
| 9,347,365 | B2 | 5/2016 | Hunter |
| 9,464,638 | B2 | 10/2016 | Cepeda-Rizo et al. |
| 10,006,346 | B2 | 6/2018 | Kemmerling et al. |
| 10,794,266 | B2 | 10/2020 | Rodriguez Erdmenger et al. |
| 11,268,435 | B2 | 3/2022 | De Avila Antonini et al. |
| 11,459,939 | B2 | 10/2022 | Conway |
| 2005/0198957 | A1 | 9/2005 | Kim |
| 2007/0033939 | A1 | 2/2007 | Wang et al. |
| 2009/0235661 | A1 | 9/2009 | Janssen |
| 2012/0210952 | A1 | 8/2012 | Reuss et al. |
| 2013/0008161 | A1 | 1/2013 | Flohr |
| 2014/0157774 | A1 | 6/2014 | McConville |
| 2019/0301352 | A1 | 10/2019 | Whelan et al. |
| 2021/0115840 | A1 | 4/2021 | Michels |
| 2021/0270181 | A1 | 9/2021 | De Avila Antonini et al. |
| 2022/0307408 | A1 | 9/2022 | De Avila Antonini et al. |

FOREIGN PATENT DOCUMENTS

| | | |
|---|---|---|
| EP | 3680466 B1 | 2/2022 |
| GB | 2129055 A | 10/1984 |
| WO | 2007108761 A1 | 9/2007 |
| WO | 2016136291 A1 | 9/2016 |
| WO | 2017171793 A1 | 10/2017 |
| WO | 2019006527 A1 | 1/2019 |

OTHER PUBLICATIONS

Instituto Nacional Da Propriedade Industrial, International Search Report for PCT/BR2018/050168 with English translation, mailed on Sep. 5, 2018, 6 pages.

Instituto Nacional Da Propriedade Industrial, Written Opinion of the International for PCT/BR2018/050168 with English translation, mailed on Sep. 5, 2018, 9 pages.

The International Bureau of WIPO, International Preliminary Report on Patentability for PCT/BR2018/050168 with English translation, issued on Jan. 7, 2020, 11 pages.

* cited by examiner

STRUCTURAL ARRANGEMENT IN A LOW-TEMPERATURE TURBOCOMPRESSOR USING OTHER POWER CONNECTIONS

CROSS-REFERENCE TO RELATED APPLICATIONS

The present application is a continuation-in-part of U.S. patent application Ser. No. 17/586,369 filed Jan. 27, 2022, which is a continuation of U.S. patent application Ser. No. 16/762,797 filed May 8, 2020, now U.S. Pat. No. 11,268,435 issued Mar. 8, 2022, which is a U.S. national stage filing of International Application No. PCT/BR2018/050168 filed May 21, 2018, which claims priority from and the benefit of Brazilian Application No. BR 10 2017 014513 1 filed Jul. 5, 2017, the contents of which are incorporated here by reference and made a part hereof.

FIELD OF THE INVENTION

The present invention relates to a structural arrangement in a low-temperature turbocompressor for an internal combustion engine, which is a system for using the energy that is available but unused during operation of an internal combustion engine for cooling the air supplied to the engine by supercharging.

Scope: The present structural arrangement in a low-temperature turbocompressor for an internal combustion engine can be used in any type of internal-combustion engine.

DESCRIPTION OF THE PRIOR ART

Prior art and problem: The prior art, and the reason for this patent, is the premise that both the torque and the efficiency of an engine are related to the mass of air that the engine can aspirate per intake cycle. Compressing the air before intake thereof into the engine increases the mass of air admitted into the cylinder, and consequently the fuel injection, thereby increasing the torque and therefore the power of the engine. This effect helps to reduce the size of a turbocharged engine in relation to a naturally aspirated engine, saving fuel and reducing mass and volume for the same power. The most common types of supercharging are mechanical compression and turbocompression. While mechanical compressors use some of the torque to increase the mass of air admitted by the engine, turbocompressors have the advantage of using energy that would otherwise be discharged into the environment through the exhaust pipe to achieve the same effect. A turbocompression system is formed by a turbine that uses the exhaust gases from the engine and that is rigidly connected to a compressor that compresses the air into the engine. However, the energy supplied to the turbine is sometimes greater than necessary, and pressure adjustment systems are required to ensure that the engine is only supplied with the necessary air, and at a safe pressure.

Both types of compressor are regulated by relief valves to work up to a pressure limit so as not to damage the engines to which the supercharging is applied. The adjustment system most commonly used in turbocompressors is a wastegate valve, which enables a portion of the exhaust gas to not pass through the turbine, thereby not increasing the energy transferred to the compressor. A pop-off valve can also be used, including in mechanical compressors, to eliminate the excess pressure in the system after the compressor by causing a sort of leak in the system when a predetermined pressure is reached. Another problem with compression is the consequent increase in the temperature of the air resulting in a reduction in density and an increase in the risk of abnormal combustion within the cylinders. To avoid these problems, vehicles that use this type of compression have to keep the compression within a safety limit, provide means for reducing the ignition advance, or use fuel of a higher octane than normal.

The devices used to minimize pinking are called intermediate coolers, or intercoolers. The intercooler is a heat exchanger used to reduce the temperature of the compressed air, increasing the density thereof and reducing the risk of abnormal combustion. Nonetheless, the inlet temperature remains high in relation to the ambient air, which is prejudicial for internal-combustion engines, in particular spark-ignition engines, which operate more efficiently at lower inlet temperatures. The issue is so important for internal-combustion engines that other devices are used in addition to the intercooler to reduce the risk of abnormal combustion, such as increasing the quantity of fuel in the mixture, injecting water along with the fuel or even, in the most extreme cases, using ice or cooling gas sprays along with the intercooler.

No references identical to the subject matter being proposed have been found in the patents of the Brazilian National Institute of Industrial Property (INPI). Patent PI 0412575-4 relates to the cooling of charge air with a secondary cooling circuit that can be liquid, since the problem of boiling is mentioned, and not recirculation of the intake gas itself, with turbines and compressors not connected in the same system, as in a conventional two-stage system.

Patents BR 102014010250-7 and PI 0603300-4 relate to the recirculation of exhaust gas, while the TCBT (or Low Temperature Turbo Charger— LTTC) recirculates the fresh intake air.

Patent PI 1100859-8 has an adjustment valve at the intake of the engine, and does not have a turbine in the return. The adjustment and relief valves are also separated and there is no reference to the return from the relief to the compressor.

SUMMARY OF THE INVENTION

Inventive concept: In view of this problem, the present structural arrangement in a low-temperature turbocompressor for an internal combustion engine incorporates the following innovations and functions:

The present structural arrangement in a low-temperature turbocompressor for an internal combustion engine incorporates the concept of supercharging of the internal-combustion engine by the compressor with pressures up to the maximum limit of the latter, unlike the usual arrangement in which the pressure inside the system is kept practically constant by adjustment systems, from the outlet of the compressor to the inlet valves of the engine. The temperature of the air compressed by the compressor is reduced by a cooling system and is then conveyed to a further turbine driven by the flow of intake air of the engine. The main innovation of the structural arrangement in a low-temperature turbocompressor for an internal combustion engine described herein is to supply the engine with air that is colder and therefore denser than a common turbocompressor, and to do so using the same amount of energy as consumed by the latter. The benefits resulting from this are enhanced engine performance levels, which may be used in order to obtain greater power or reduce consumption, since the denser air contains more oxygen and allows more fuel into the combustion chamber at the same pressure, achieving a larger explosion, which increases the power-to-weight ratio, and the cooler air allows work at more aggressive compression ratios and/or ignition advances without problems of pre-ignition/pinking, thereby enhancing engine performance.

The present structural arrangement in a low-temperature turbocompressor for an internal combustion engine can be installed fully or partially, as required or to order.

Each component of the present structural arrangement in a low-temperature turbocompressor for an internal combustion engine can be adapted to preexisting systems.

In accordance with an aspect of the invention, a low pressure turbo compressor arrangement for an internal combustion engine is provided. The arrangement comprises an exhaust gas turbine configured to receive exhaust gas from an internal combustion engine and to discharge the exhaust gas to an ambient environment and a compressor configured to receive and compress an ambient intake air stream and output a compressed air stream, wherein the compressor and the first turbine are mechanically connected to a first motor. The first motor can be between the exhaust gas turbine and the compressor. The arrangement further comprises an intercooler coupled to an output of the compressor, wherein the intercooler is configured to receive the compressed air stream from the compressor and discharge a cooled compressed air stream and an air intake turbine configured to receive the cooled compressed air stream from the intercooler and to discharge an expanded cooled air stream to an internal combustion engine. A first generator is mechanically connected to the air intake turbine.

The arrangement can further include a relief valve in fluid communication with the expanded cooled air stream from the air intake turbine wherein the relief valve discharges excess expanded cooled air stream, and a return turbine configured to receive the excess expanded cooled air stream from the relief valve and discharge the excess expanded cooled air stream to the compressor. A second generator can be mechanically connected to the return turbine. Power from the first generator and the second generator can be transferred to the first motor. In one aspect of the invention, the second generator is also connected to the compressor and is between the compressor and the return turbine.

The first motor can be either an electric motor, a hydraulic motor or a pneumatic motor. Similarly, the first (or second) generator can be an electric generator, a hydraulic generator or a pneumatic generator. Moreover, the generators can comprise a second motor functioning as a generator.

In one arrangement the return turbine can be connected to the first generator. The first generator can also be between the return turbine and the air intake turbine.

In another aspect of the invention a low pressure turbo compressor arrangement for an internal combustion engine can comprise an exhaust gas turbine coupled to a first shaft and configured to receive exhaust gas from an internal combustion engine and to discharge the exhaust gas to an ambient environment and a compressor coupled to the first shaft and configured to receive and compress an ambient intake air stream and output a compressed air stream. The compressor is mechanically connected to a first motor. An intercooler is coupled to an output of the compressor, wherein the intercooler is configured to receive the compressed air stream from the compressor and discharge a cooled compressed air stream, and an air intake turbine is configured to receive the cooled compressed air stream from the intercooler and to discharge an expanded cooled air stream to an internal combustion engine.

A first generator can be mechanically connected to the air intake turbine. The arrangement can also include a relief valve in fluid communication with the expanded cooled air stream from the air intake turbine, wherein the relief valve discharges excess expanded cooled air stream, a return turbine configured to receive the excess expanded cooled air stream from the relief valve and discharge the excess expanded cooled air stream to the compressor and a second generator mechanically connected to the return turbine.

Advantages: The advantages of the structural arrangement in a low-temperature turbocompressor for an internal combustion engine are as follows:

It enables the engine to be supplied with air that is colder and therefore denser than a common turbocompressor, using the same amount of energy as consumed by this latter.

It enables more fuel to be conveyed to the combustion chamber and enables a larger explosion, which increases the power-to-weight ratio.

It enables the engine to operate with higher compression ratios and/or greater ignition advance without causing problems of abnormal combustion, which increases the performance of the engine.

The turbocompressor only connects to the cooled-air turbine system once the turbines have started to generate power for the system.

Other features and advantages of the invention will be apparent from the following specification taken in conjunction with the following Figures.

BRIEF DESCRIPTION OF THE DRAWINGS

Drawings: In order to facilitate the search and understanding of the present patent, as recommended in the report, according to a basic and preferred embodiment created by the applicant, reference is made to the attached drawing, which supplements and supports the present description, in which.

Inversion of the sequence between the return air and intake air turbines; (B) between the exhaust turbine and the compressor.

Figure 8:
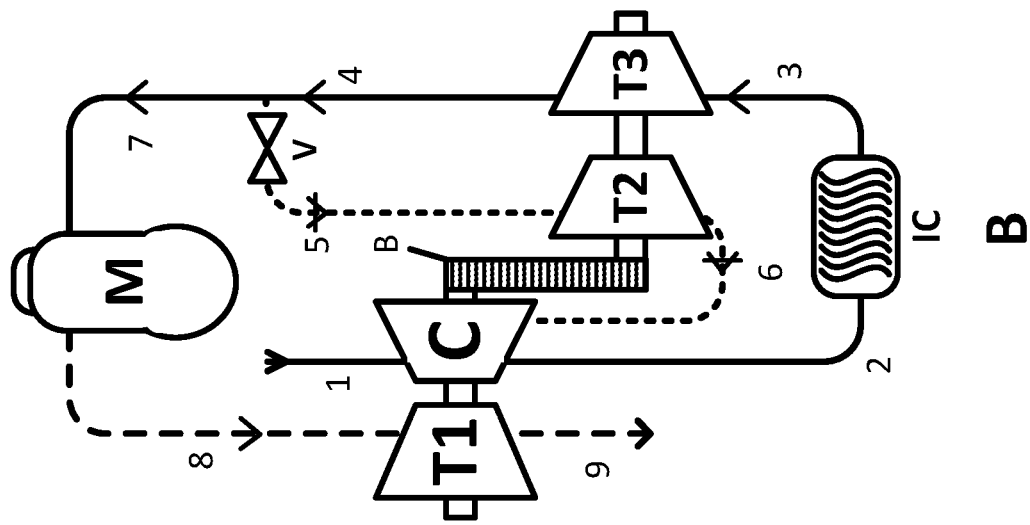
Figure 8:
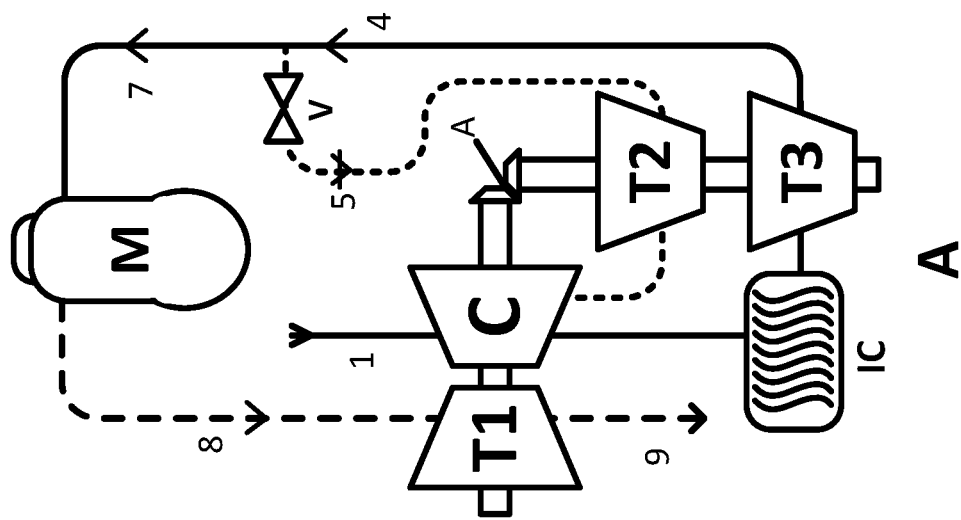

FIG. 8—Schematic view of alternative arrangements of the structural arrangement in a low-temperature turbocompressor for an internal combustion engine using a mechanical connection between two shafts. (A) Assembly perpendicular to the cold turbines; (B) assembly parallel to the cold turbines.

Figure 9:
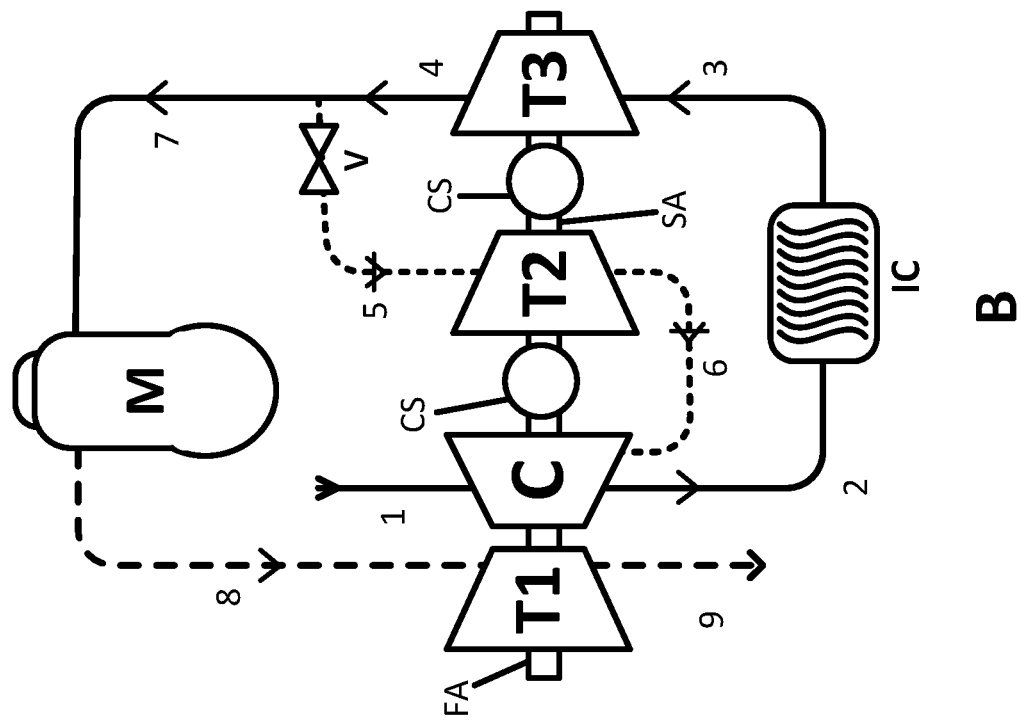
Figure 9:
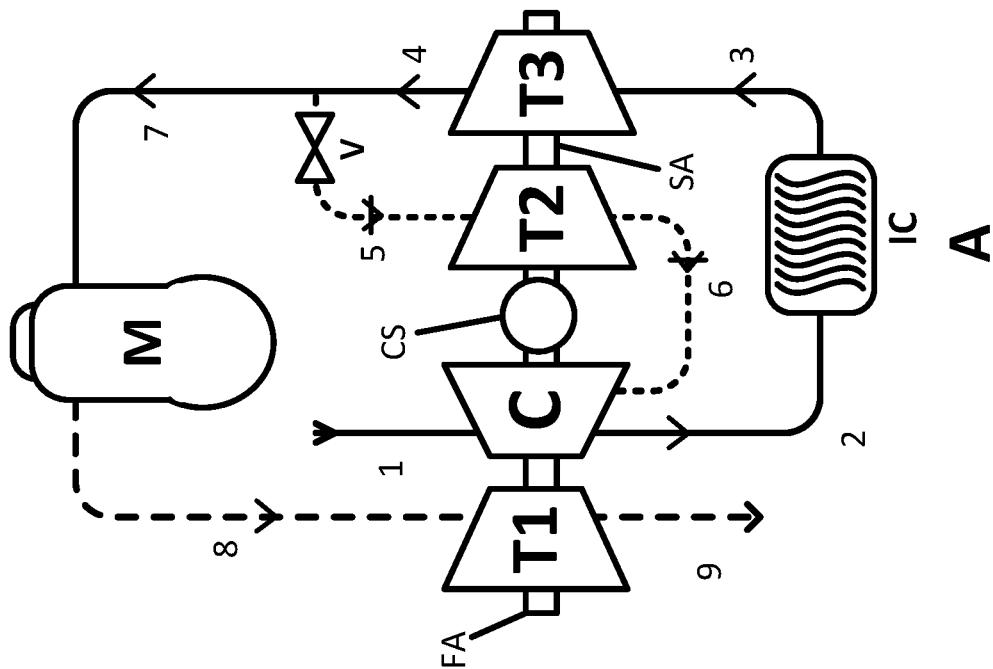

FIG. 9—Schematic view of the structural arrangement in a low-temperature turbocompressor for an internal combustion engine with a coupling/uncoupling system for the cold turbines. (A) dependent using a coupling system to connect the first axle to the second axle; (B) independent using a coupling system to connect the first axle to the second axle and another coupling system to connect the second axle to the third axle.

FIGS. 10-19 are schematic views of alternative aspects of the invention including electrical, hydraulic or pneumatic motors/generators assisting the turbines/compressors without requiring some or all of the components being associated with specific shafts.

LISTING OF ELEMENTS/DEFINITIONS FOR FIGURES

Unbroken line 1-7: Intake pipe
Dotted line 5-6: Return pipe
Dashed line 8-9: Exhaust pipe
T1—Exhaust gas turbine
C—Compressor
T2—Return air turbine
T3—Intake air turbine
IC—Intercooler
IC'—Additional intercooler
V—Return valve
M—Engine
T'—Additional turbine
C'—Additional compressor
FA—First Axle
SA—Second Axle
TA—Third Axle

ADDITIONAL LISTING OF ELEMENTS/DEFINITIONS FOR FIGS. 10-19

E=Engine (Internal Combustion Engine)
T1=Turbine 1=Hot Turbine
T2=Turbine 2=Return Turbine
T3=Turbine 3=Cold Turbine
V=Valve (to adjust pressure in the engine)
M'=Motor (e.g., electrical, hydraulic, pneumatic)
G=Generator (e.g., electrical, hydraulic, pneumatic)
μ=Connections between Generators and Motors (e.g., electrical, hydraulic, pneumatic)

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Description: In the structural arrangement in a low-temperature turbocompressor for an internal combustion engine (FIG. 1), the turbocompression system is formed by the exhaust gas turbine (T1) rigidly connected to the compressor (C). The compressor conveys the fluid to a cooler that can be an intercooler (IC), but that is not limited to this or other types of heat exchangers, nor to a specific coolant fluid, since any type of coolant fluid can used. Sequentially, the flow of cooled compressed air is conveyed to a second turbine, known as the intake air turbine (T3), the pressure of which is regulated by a return valve (V) that prevents the overloading of the engine (M), directing the excess flow to a third turbine, known as the return air turbine (T2), which returns the air to the inlet of the compressor (C). The two turbines T2 and T3 are rigidly connected to the compressor (C) and to the exhaust gas turbine (T1). The system can use compressors and turbines of variable geometry and any other compressors or turbines that can be installed on the same shaft, with any type of assembly constraining the movement thereof. The system can also include multiple stages with turbocompressors on separate shafts or on the same shaft as the former. The system proposed in the structural arrangement in a low-temperature turbocompressor for an internal combustion engine can also be used in conjunction with other air compressors, mechanical (FIG. 6) or otherwise, or even with additional turbocompressors, all in series (FIG. 5) or in parallel (FIGS. 2, 3 and 4) with the first. The system can also be used with compressors and turbines of variable geometry, with multiple stage expansion and/or compression. The engine can be a two- or four-stroke Otto-cycle or diesel engine. Additional heat exchangers can also be used, and any coolant fluid can be used.

Figure 1:
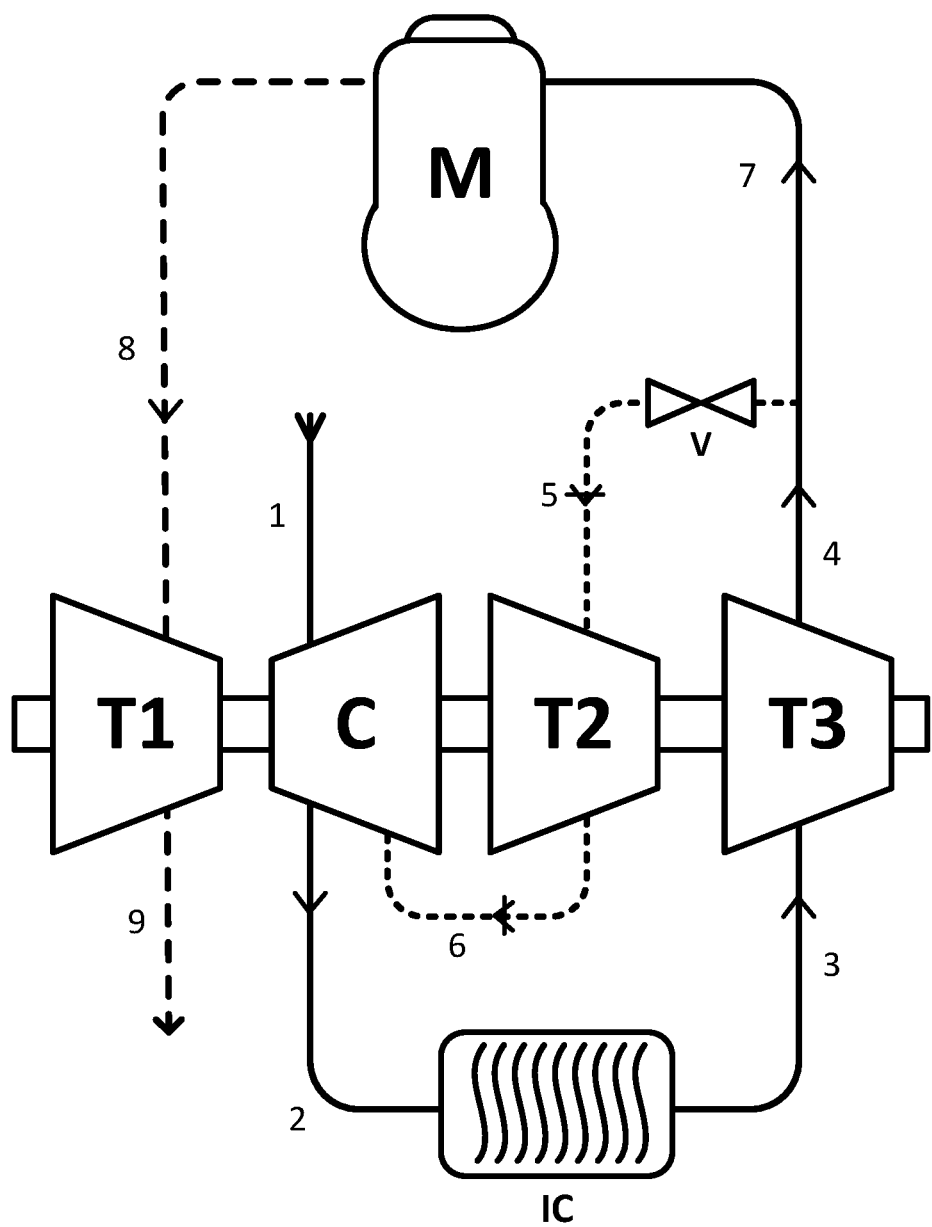
FIG. 1—Schematic view of the structural arrangement in a low-temperature turbocompressor for an internal combustion engine with just one compression stage.

FIG. 1 shows operation of the structural arrangement in a low-temperature turbocompressor for an internal combustion engine, in which the turbocompression system is formed by the exhaust gas turbine (T1), which uses the exhaust gases from the engine that are flowing through the exhaust pipe (dashed line) and is rigidly connected to the compressor (C). The temperature of the air in this compressor (C), which is arranged at the start of the intake pipe (unbroken line), is lowered by the intercooler cooling system (IC), after which the air is conveyed to the intake air turbine (T3), moved by the flow of intake air of the engine. The pressure is regulated by the return valve (V), which releases some of the compressed air to ensure that the pressure does not exceed the maximum pressure admitted by the engine (M). The air released by this valve is conveyed through the return pipe (dotted line) to the return air turbine (T2), which expands this mass of air from the working pressure of the engine to atmospheric pressure, resulting in a loss of heat. This air is conveyed to the inlet of the compressor (C) as part of the air that is compressed in the cycle, reducing the work done by the compressor on account of the low temperature thereof. The turbines moved by compressed air are constrained to move with the compressor (C) to generate more power and to enable the compressor (C) to produce even greater pressures. The cycle is therefore fed back by the work of the compressed-air turbines (the return air turbine (T2) and the intake air turbine (T3)) and by the lower effort required by the compressor (C) to compress the cooler air, tending to reach an equilibrium resulting from mechanical and thermal losses. Therefore, the objective of the structural arrangement in a low-temperature turbocompressor for an internal combustion engine is to cause the temperature of the intake air of the engine, at a given working pressure of the engine, to be significantly lower than the temperature reached in a normal system.

Figure 2:
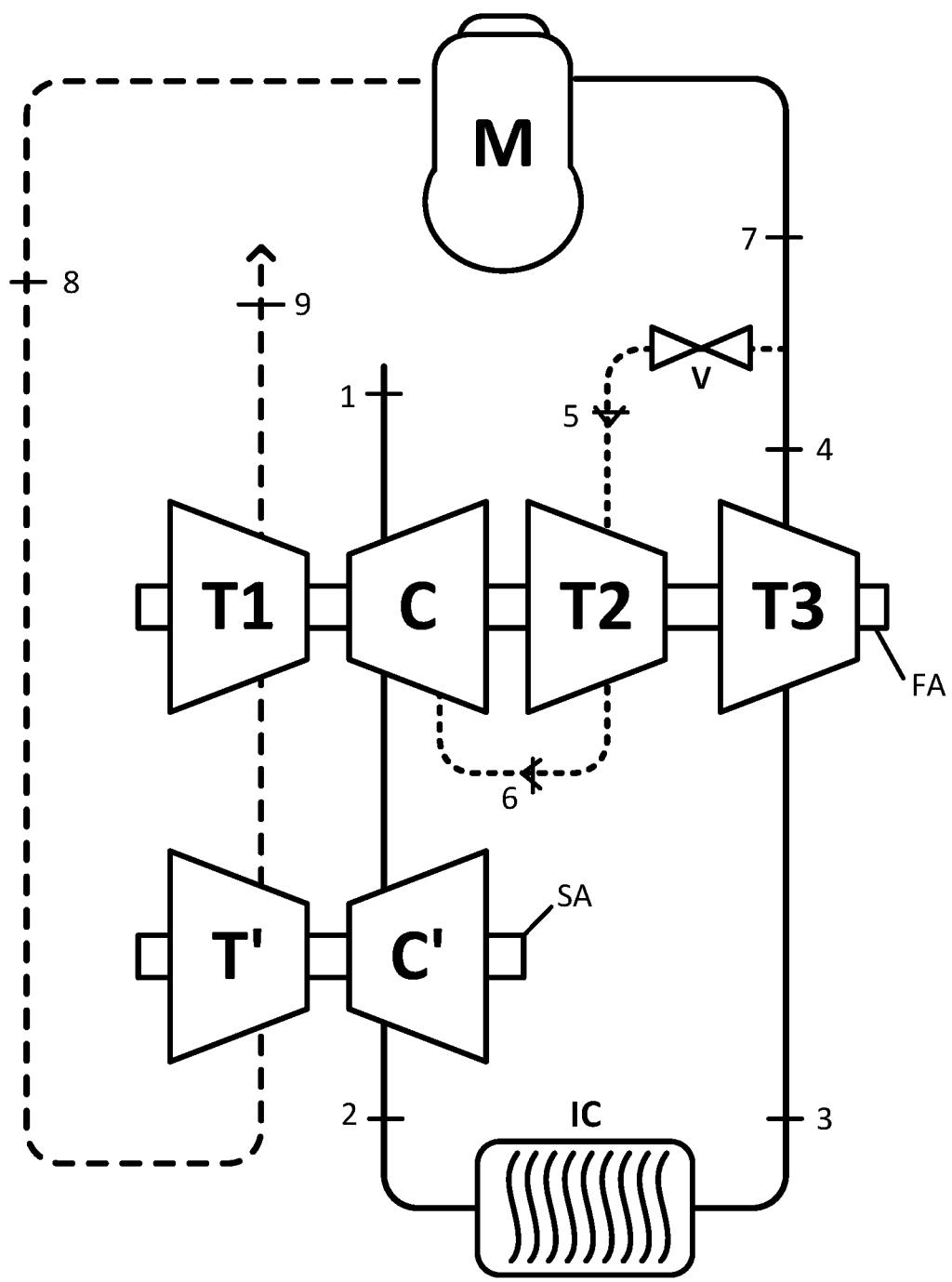
FIG. 2—Schematic view of the structural arrangement in a low-temperature turbocompressor for an internal combustion engine assembled in a first axle with an additional turbocompressor arranged in series assembled in a second axle.
Figure 3:
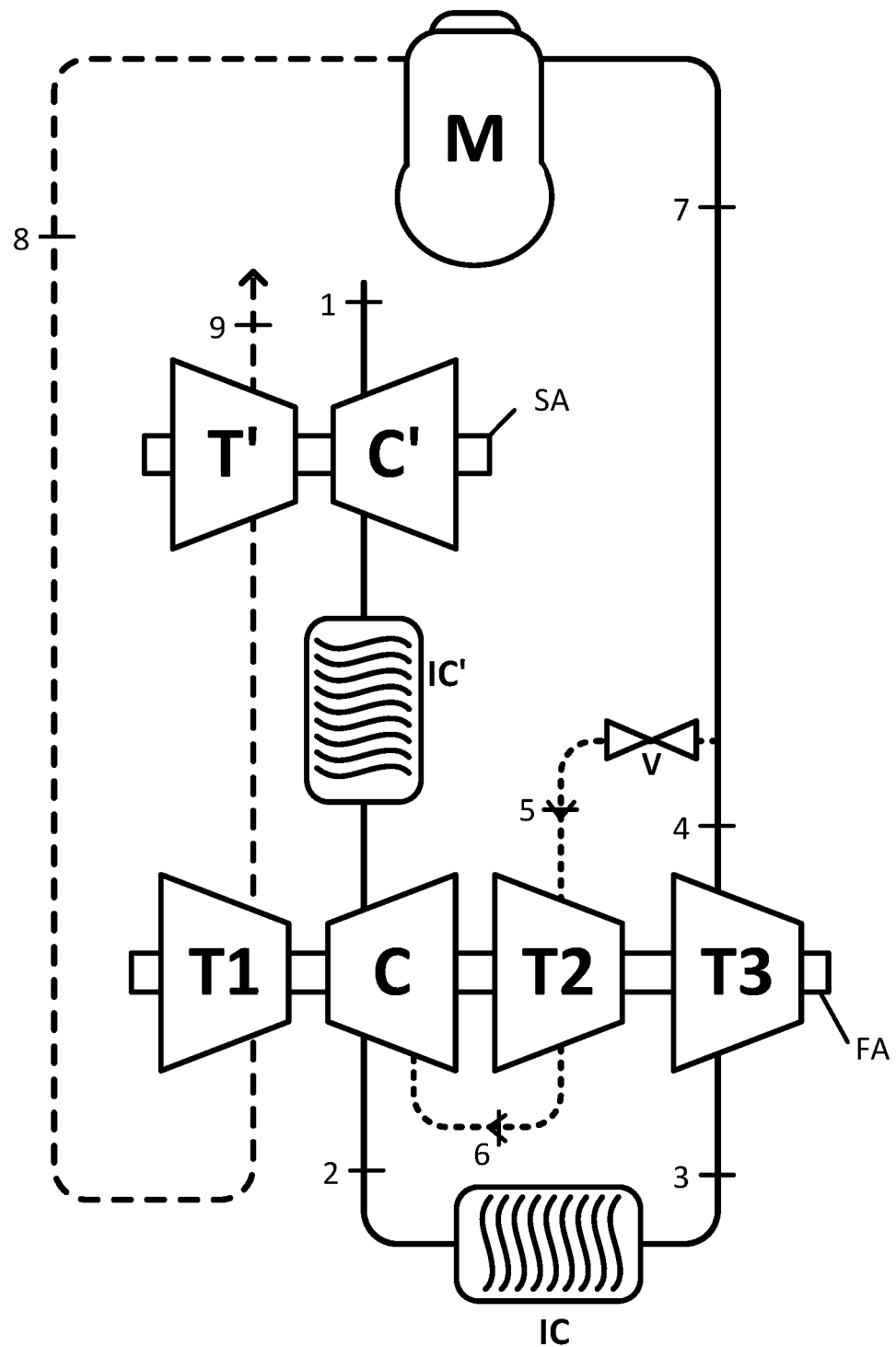
FIG. 3—Schematic view of the structural arrangement in a low-temperature turbocompressor for an internal combustion engine assembled in a first axle with an additional low-pressure turbocompressor arranged in series assembled in a second axle and an additional intercooler.
Figure 4:
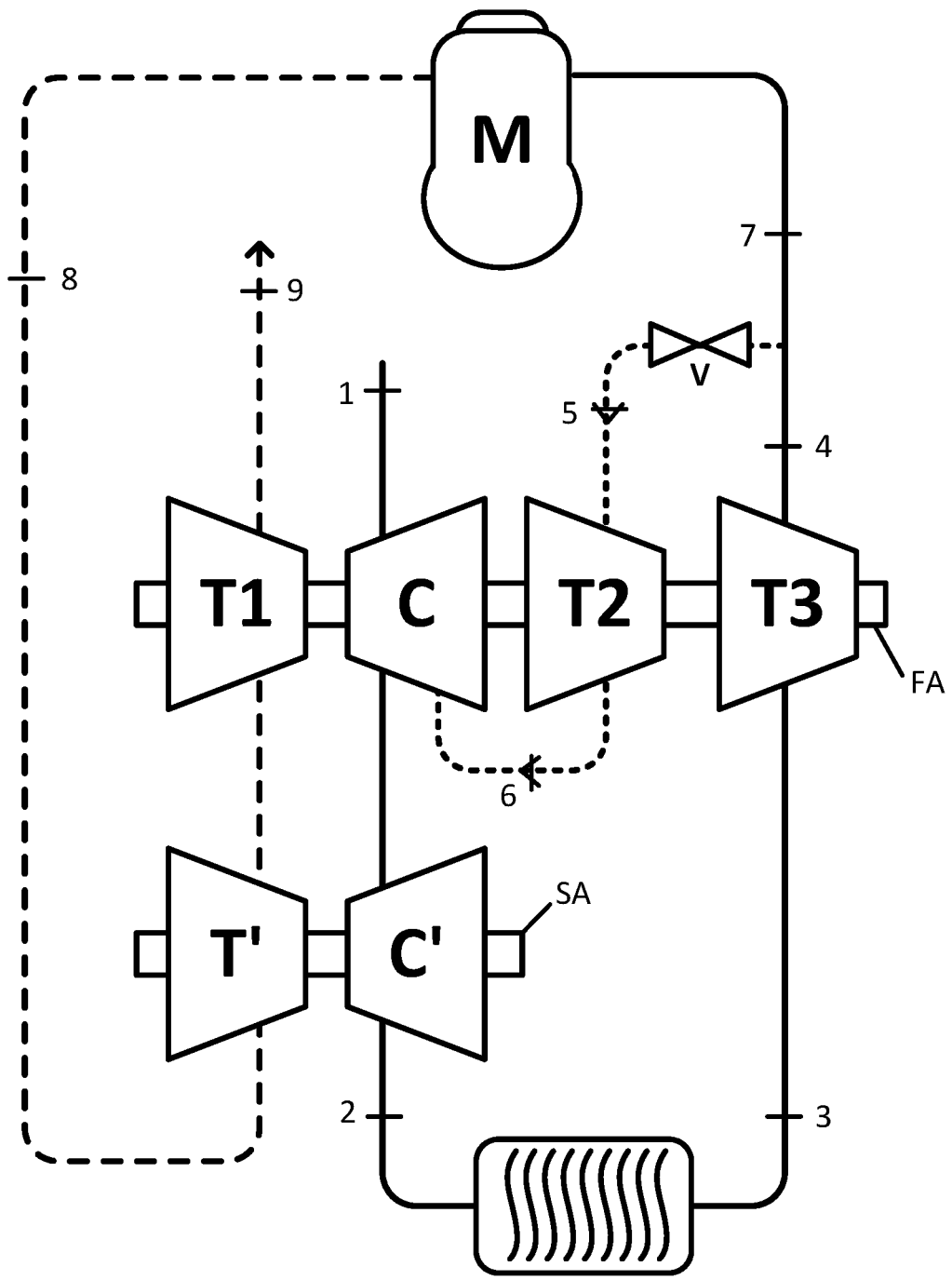
FIG. 4—Schematic view of the structural arrangement in a low-temperature turbocompressor for an internal combustion engine assembled in a first axle with an additional high-pressure turbocompressor arranged in series assembled in a second axle.
Figure 5:
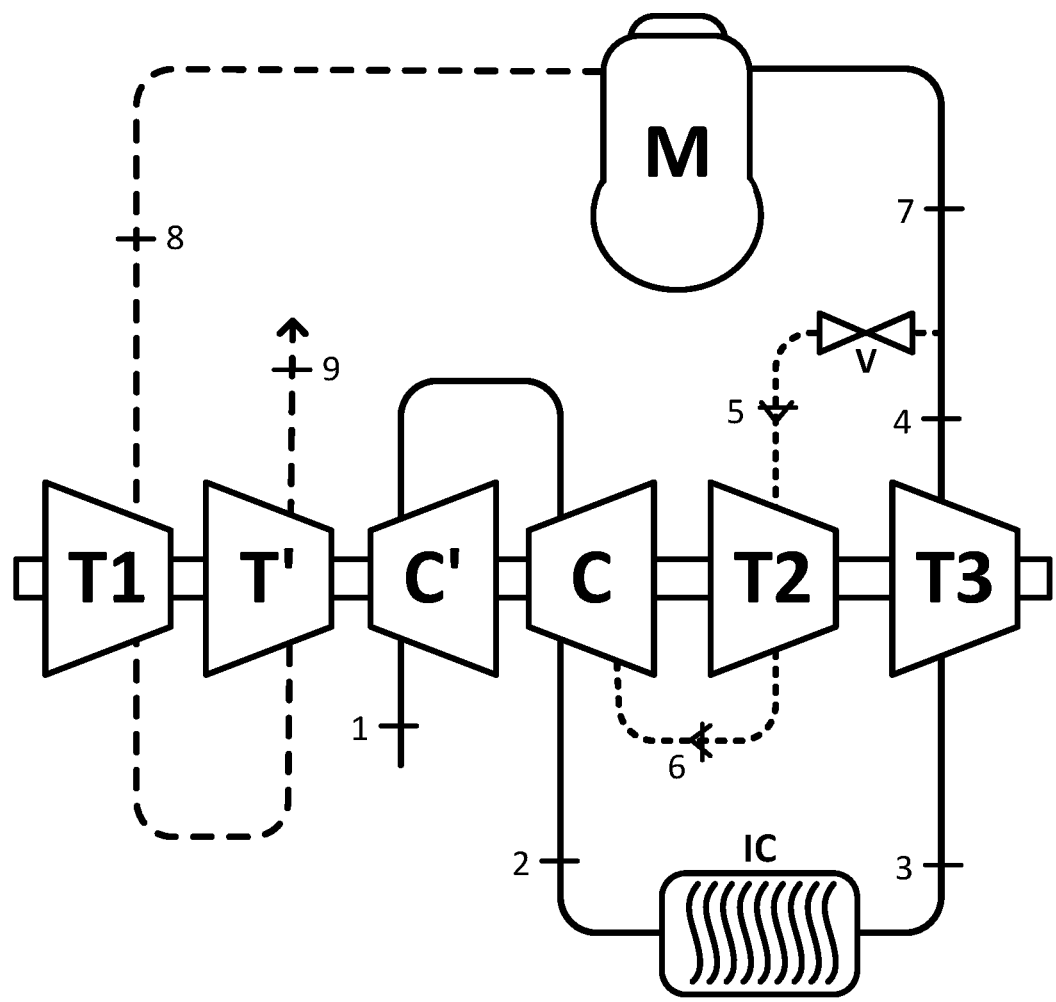
FIG. 5—Schematic view of the structural arrangement in a low-temperature turbocompressor for an internal combustion engine with an additional low-pressure turbocompressor on the same shaft.
Figure 6:
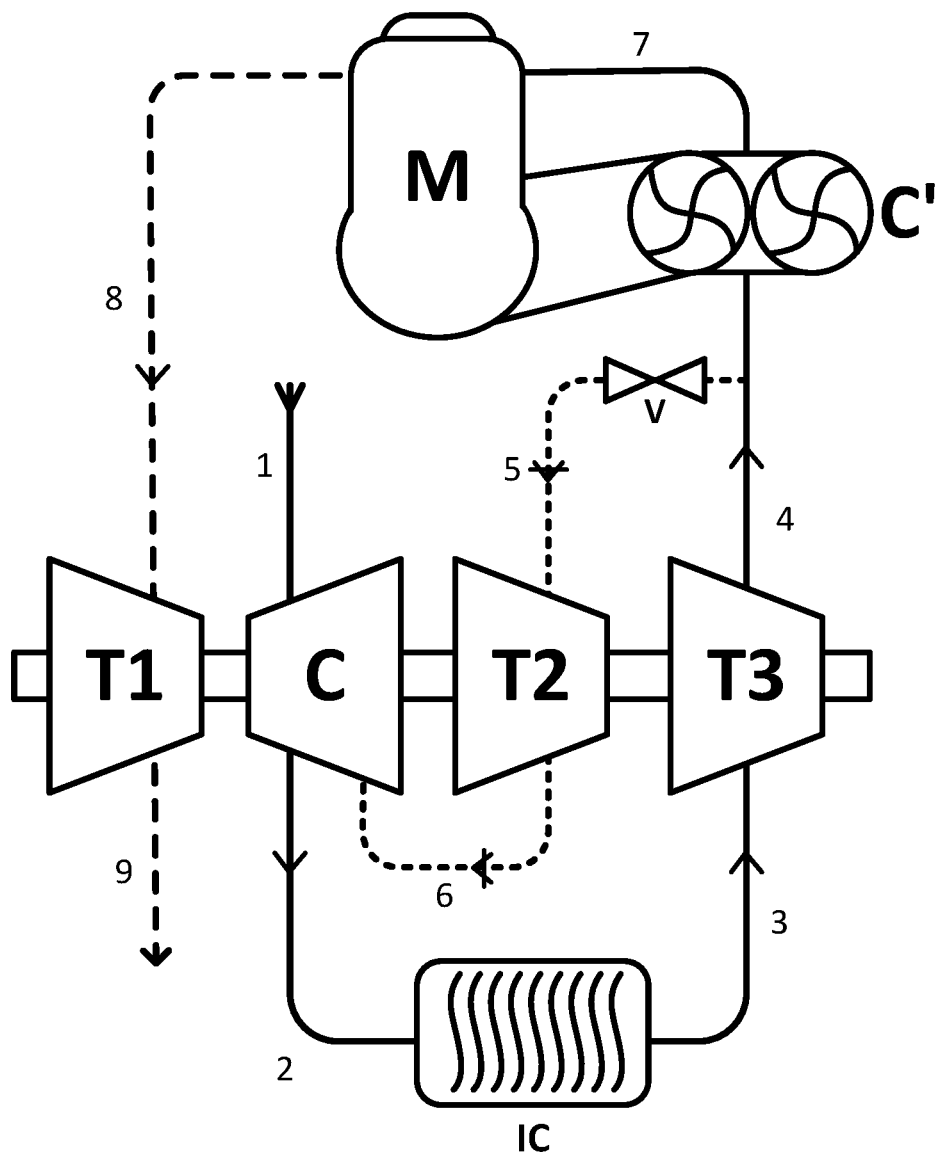
FIG. 6—Schematic view of the structural arrangement in a low-temperature turbocompressor for an internal combustion engine with an additional mechanical compressor connected to the engine's wheel.
Figure 7:
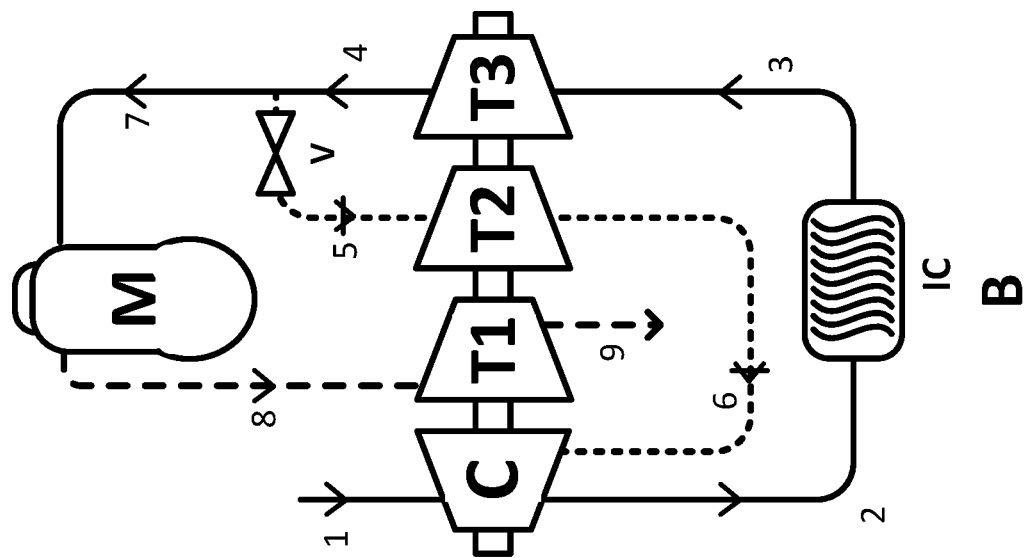
FIG. 7—Schematic view of alternative inversions of the sequence of the structural arrangement in a low-temperature turbocompressor for an internal combustion engine. (A)
Figure 7:
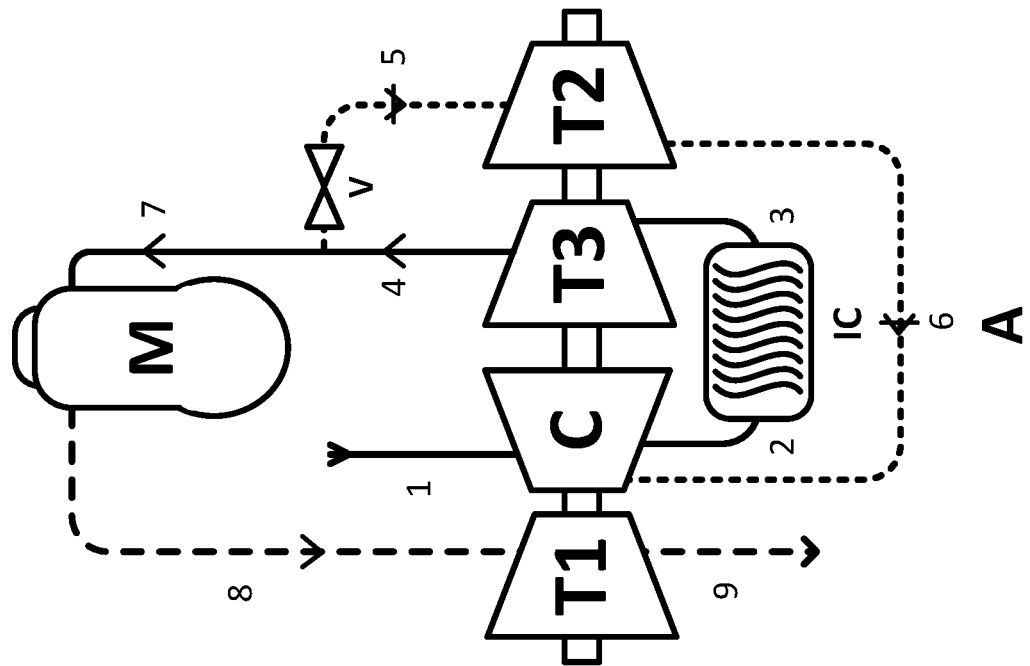

To achieve this purpose, other configurations of the structural arrangement in a low-temperature turbocompressor for an internal combustion engine are possible, as shown in FIGS. 2, 3, 4, 5, 6, 7 and 8. FIGS. 2 and 3 relate to the installation of an additional low-pressure turbocompressor in parallel with the turbocompressor formed by the exhaust gas turbine (T1) and the compressor (C). In these configurations, an additional turbine (T') installed in the exhaust pipe uses the exhaust gases from the engine after the exhaust gas turbine (T1) to drive a constrained additional compressor (C') installed in the intake pipe before the compressor (C), increasing air intake. In FIG. 3, the air coming from the additional compressor (C') is cooled by an additional intercooler (IC') before entering the compressor (C). FIG. 4 relates to the installation of an additional high-pressure turbocompressor in parallel with the turbocompressor formed by the exhaust gas turbine (T1) and the compressor (C). In this configuration, an additional turbine (T') installed in the exhaust pipe uses the exhaust gases from the engine before the exhaust gas turbine (T1) to drive a constrained additional compressor (C') installed in the intake pipe between the compressor (C) and the intercooler (IC), also to increase air intake. FIG. 5 relates to the installation of an additional high-pressure turbocompressor on the same shaft as the other turbocompressors. In this configuration, an additional turbine (T') installed in the exhaust pipe uses the exhaust gases from the engine after the exhaust gas turbine (T1) to drive an additional compressor (C') rigidly connected to the system, installed in the intake pipe before the compressor (C), also to increase air intake. FIG. 6 relates to the installation of an additional mechanical compressor (C') arranged in parallel with the turbocompressor formed by the exhaust gas turbine (T1) and the compressor (C). In this configuration, an additional constrained mechanical compressor (C') is installed on the intake pipe between the intake air turbine (T3) and the engine (M), also to increase air intake. FIGS. 7 and 8 show other possible configurations intended to take advantage of available spaces and/or conditions. FIG. 7A shows the installation of the intake air turbine (T3) between the compressor (C) and the return air turbine (T2), bringing the first turbine of the intercooler (IC) closer. FIG. 7B shows the option of placing the exhaust gas turbine (T1) in sequence with the return air turbine (T2) and intake air turbine (T3) positioned on the shaft after the compressor. FIG. 8 shows an example of the rotational transmission options from the return air turbine (T2) and intake air turbine (T3) to the compressor (C), perpendicularly using gears (A) or in parallel using a belt (B).

FIG. 9 explores the possibility of using a coupling system (CS) that enables the turbocompressor formed by the exhaust gas turbine (T1) and the compressor (C) to only connect to the system of the return air turbine (T2) and the intake air turbine (T3) when the turbines start generating power for the system. In configuration "A" in FIG. 9, the coupling occurs when the system of the return air turbine (T2) and the intake air turbine (T3) in conjunction begins generating power for the system, and configuration "B" in FIG. 9 provides the option of the return air turbine (T2) being coupled when the turbine starts generating power for the system, followed by coupling of the intake air turbine (T3) when the turbine reaches the required state.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, characterized in that it supplies the engine with air that is colder and therefore denser than a common turbocompressor, and does so using the same amount of energy as consumed by this latter.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 001, formed by a system comprising a turbocompressor and turbines and characterized in that the turbocompression system is formed by the exhaust gas turbine (T1) rigidly connected to the compressor (C), in which the compressor conveys the fluid to a fluid cooler that can be an intercooler (IC), but that is not limited to this or other types of heat exchanger, nor to a specific coolant fluid, since any type can be used, and sequentially, the flow of cooled compressed air is conveyed to an intake air turbine (T3) with pressure regulated by a return valve (V) that prevents the overloading of the engine (M) and directs the excess flow to a return air turbine (T2) that returns the air to the inlet of the compressor (C), in which the turbines T2 and T3 are rigidly connected to the compressor (C) and to the exhaust gas turbine (T1).

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 1 and 2, with alternative structures characterized in that the system can use compressors and turbines of variable geometry or any other compressors or turbines that can be installed on the same shaft, with any type of assembly constraining the movement thereof, include multiple stages with turbocompressors on separate shafts or on the same shaft as the first, be used in conjunction with other air compressors, mechanical (FIG. 6) or otherwise, or even with additional turbocompressors, all in series (FIG. 5) or in parallel (FIGS. 2, 3 and 4) with the former, use compressors and turbines of variable geometry, with multiple stage expansion and/or compression, in two- or four-stroke Otto-cycle or diesel engines, using additional heat exchangers and any coolant fluid, with the option of assembling fully or partially as required, in which each component part can be adapted to pre-existing systems.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 1, 2 and 3, with connection of the turbocompressor to the system of cooled air turbines, characterized in that they occur, but not exclusively, from the moment at which the turbines begin generating power for the system, individually or in a group (FIG. 9).

FIGS. 10-19 show schematics for structural arrangements for a low-temperature turbocompressor that incorporate electrical and/or hydraulic and/or pneumatic—motors and/or generators—to link and transfer power from some or all of the turbines to some or all of the compressors. This means that the turbines can be rigidly connected to the compressor(s) (e.g., by a shaft) or not rigidly connected compressor(s). The system can use compressors and turbines of variable geometry and any other compressors or turbines that can be installed on the same shaft, with any type of assembly constraining the movement thereof or electrically connected.

Figure 10:
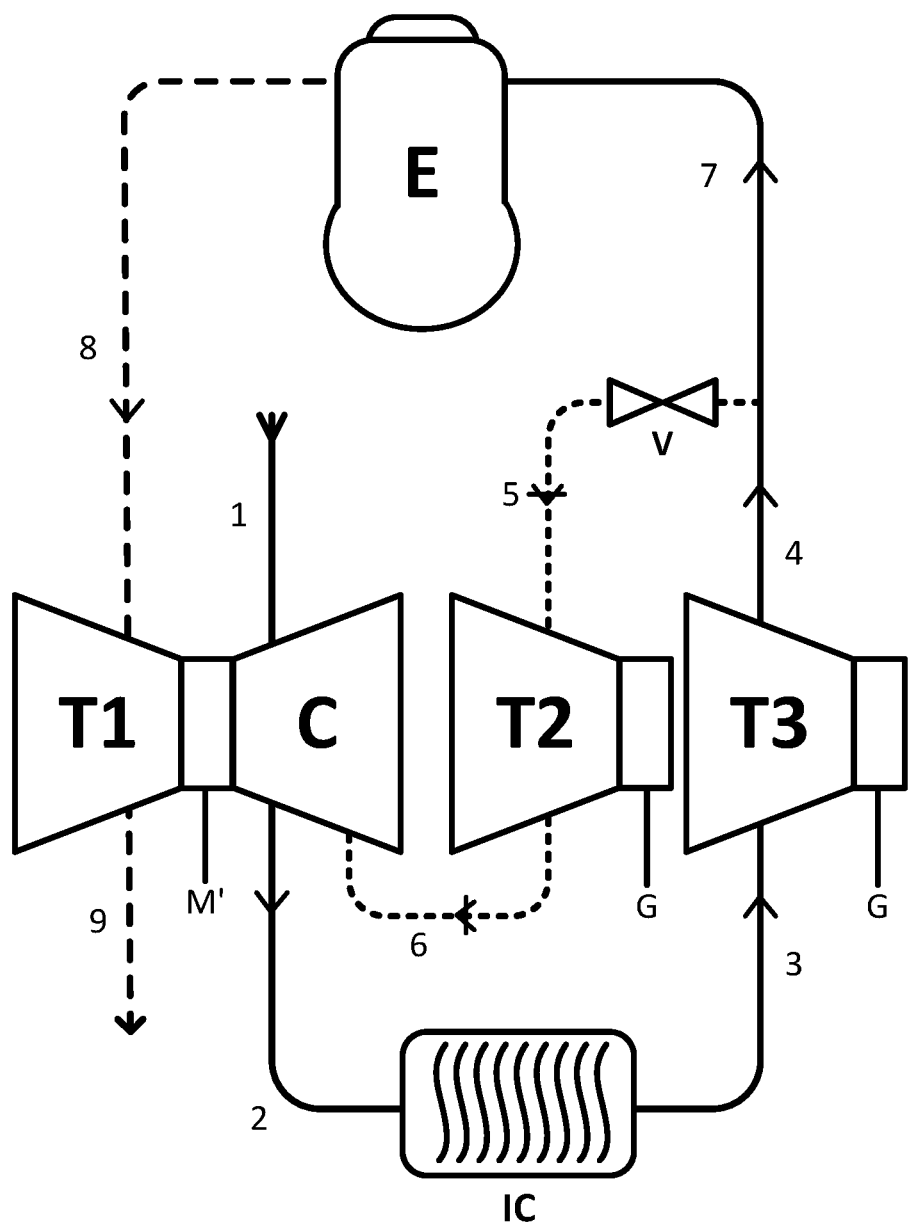

In one alternative aspect of the invention shown in FIG. 10, the turbines T1, T2 and T3 are not rigidly connected to the same shaft as the compressor C. Instead, the exhaust gas turbine T1 is coupled to the compressor C by a motor M' (either an electric motor, a hydraulic motor or a pneumatic motor). The intake air turbine T3 and the return air turbine T2 are coupled to generators G (either an electrical generator, a hydraulic generator or a pneumatic generator). One of the benefits of this system is that it provides for easier mechanical assemblies and manufacturing of the component features. Additionally, the turbines can run at optimal speeds with increased efficiency, and it is possible to connect the components with the electrical parts of the whole car or system. Moreover, the arrangement is split-hooted with the hot parts (i.e, the exhaust turbine) is positioned on the hot side of the engine and the cold parts (i.e., the intake turbine and return turbine) can be positioned on the other (cold) side of the engine which can increase the thermal efficiency of the arrangement and avoid heat changes between hot and cold parts. This also reduces the size of the components in each side and allows for placement in a small engine space.

The arrangement of FIG. 10 provides a number of other advantages over prior systems. The arrangement enables the engine to with air that is colder and therefore denser than a common turbocompressor, using the same amount of energy as consumed by this latter. It also enables more fuel to be conveyed to the combustion chamber and enables a larger explosion, which increases the power-to-weight ratio, and enables the engine to operate with higher compression ratios and/or greater ignition advance without causing problems of abnormal combustion, which increases the performance of the engine.

In this arrangement, the turbocompressor only connects to the cooled-air turbine system once the turbines have started to generate power for the system. Moreover, each component can be mechanically connected to each other or to a motor or generator which will transfer the energy between the components.

The arrangement will be easier to fit a best set of components and make them work in their best range of operation because the rotation speed can be different in each one. The whole system can be connected to the electric components or even to the general vehicle or net allowing changes of energy in different ways and increasing the efficiency of the whole system. Additionally, it will be possible split the components in different sides of the engine, allowing hot parts to work in the hot side and cold parts to work in the cold side. It also increases the thermal efficiency, which allows for a reduction in costs of manufacturing by using less expensive materials for the cold side.

FIGS. 11-19 show various modifications to the arrangement of FIG. 10. In all of the alternatives, the exhaust gases from the engine E pass through the hot turbine T1 as indicated through connection 8. After the hot turbine T1 the gases discharge through pipe 9 into the ambient.

Additionally, in all of the alternatives, the ambient air enters the compressor C through connection 1 and the cold air from the return turbine T2 mixes with it through connection 6. The compressor C compresses the air and passes it through the intercooler IC. The pressurized air goes to the cold turbine through connection 3, and then into the engine E through connections 4 and 7.

Figure 11:
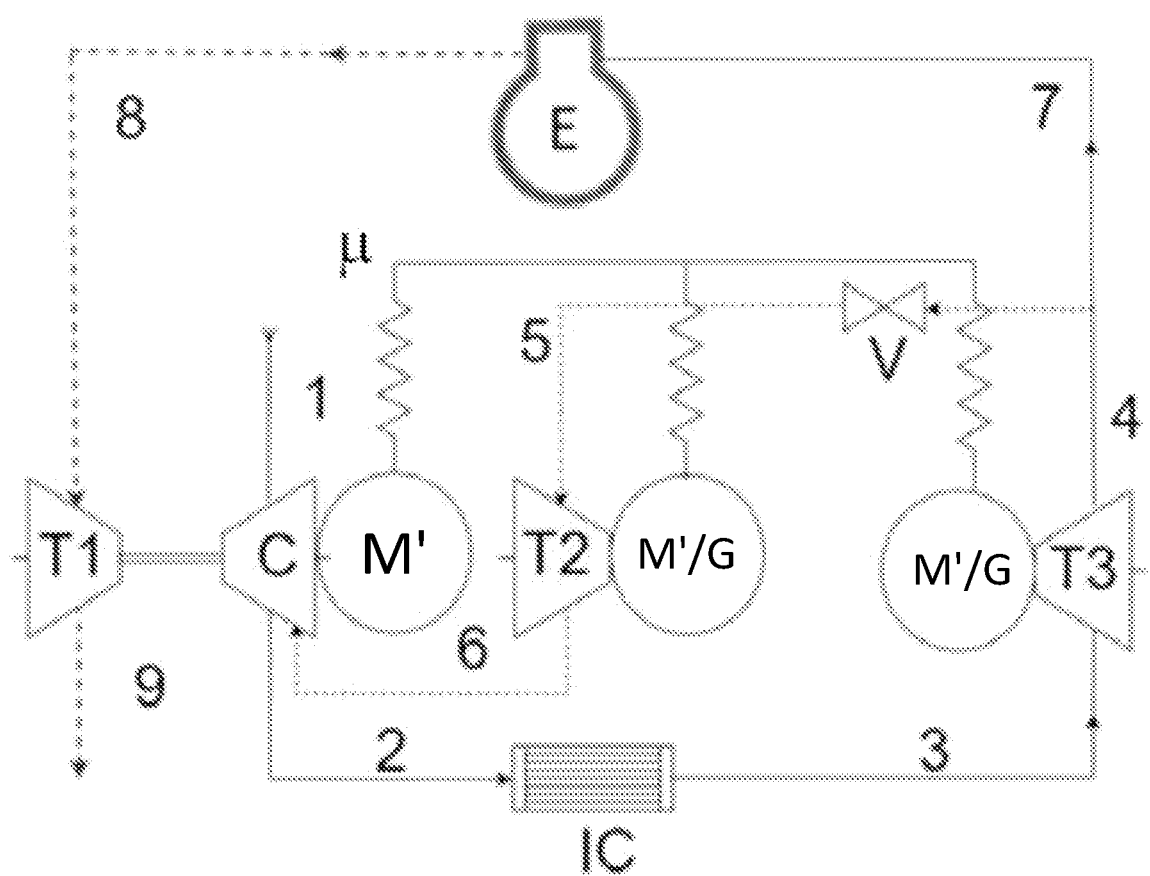

The alternative arrangement in FIG. 11 shows the exhaust gas, or hot, turbine T1 connected to the compressor C by a shaft (i.e., the standard turbocompressor of FIGS. 1-9) and a motor M'. The motor M' can be electric or hydraulic or pneumatic, and helps giving power to drive the shaft. The power comes from the intake, or cold, turbine T3 and return turbine T2 through the lines μ that are mechanically connected to a generator G, or a motor M' functioning as a generator.

Figure 12:
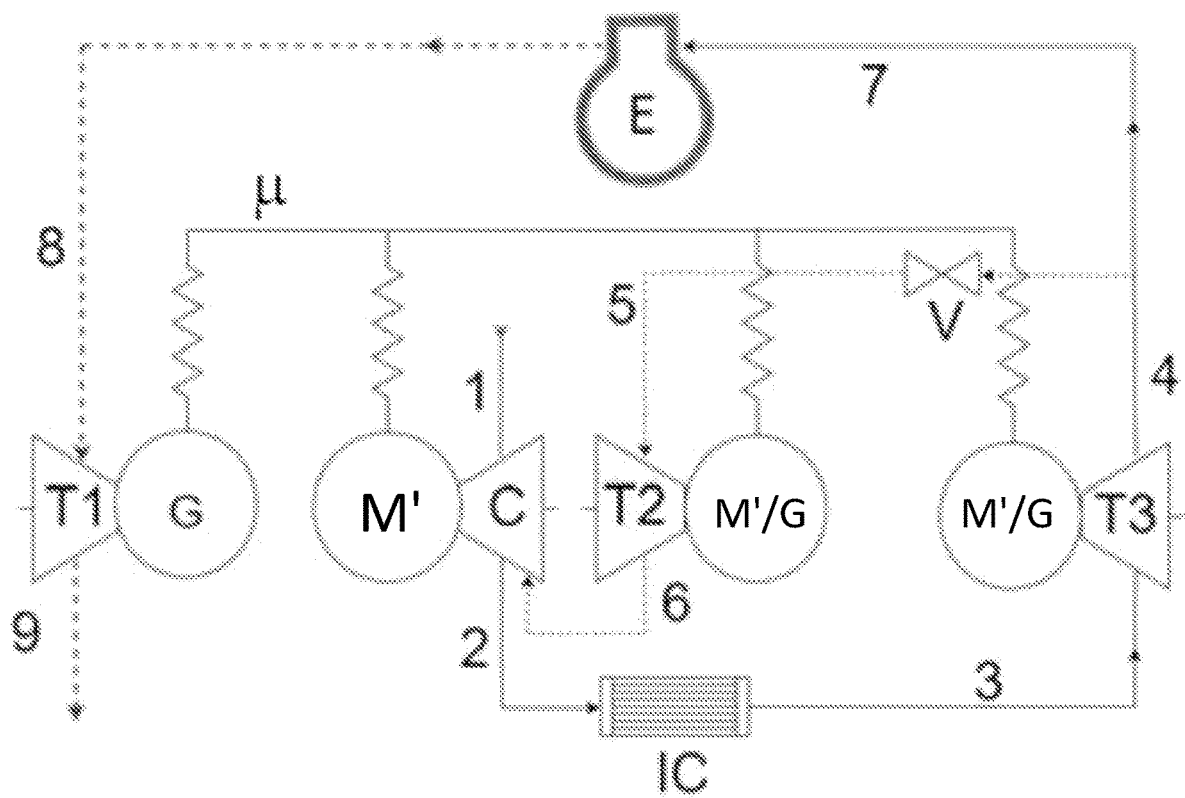

FIG. 12 shows the hot turbine T1 mechanically connected to a generator G that sends power to a motor M' connected to the compressor C. The cold and return turbines T3, T2 are also mechanically connected to generators G, or motors M' functioning as generators that send power through line μto the motor M' connected to the compressor C.

Figure 13:
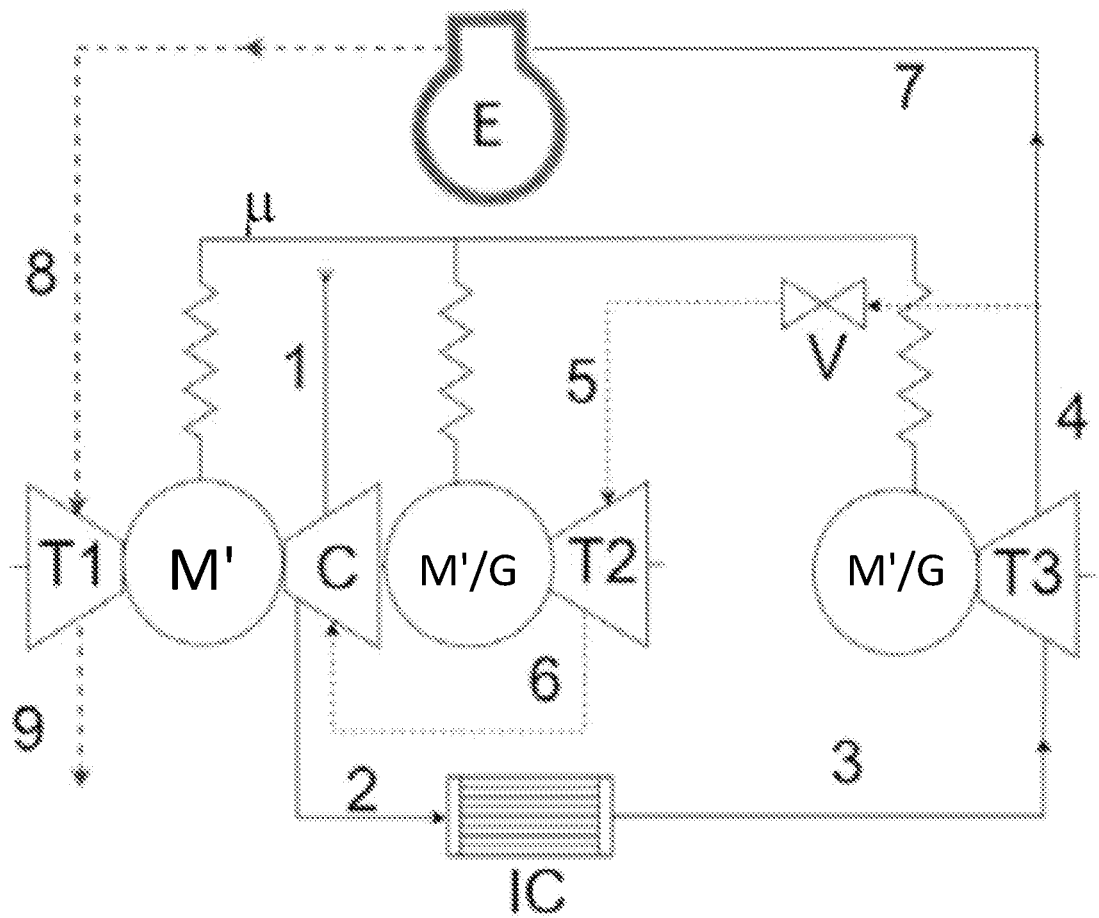

FIG. 13 show the hot turbine T1 mechanically connected to a motor M' which is mechanically connected to the compressor C. The compressor C is also mechanically connected to a generator G (or a motor functioning as a generator) that is connected to the return turbine T2. The intake or cold turbine T3 is mechanically connected to a generator G (or a motor functioning as a generator) which provides power to the motor M' connected the hot turbine T1 and compressor C through line μ.

Figure 14:
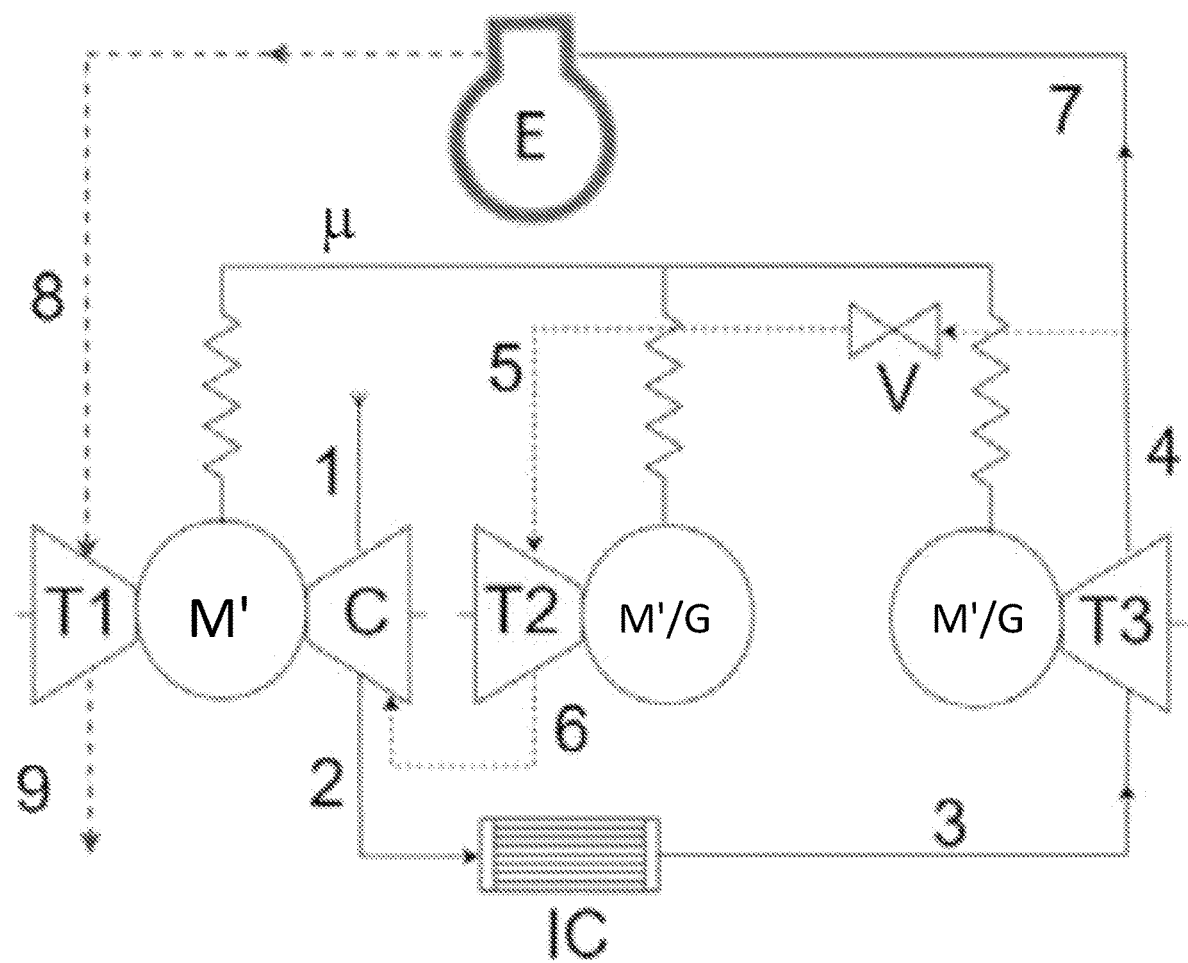

FIG. 14 shows the hot turbine T1 mechanically connected to a motor M' that is mechanically connected to the compressor C. The motor M' receives power via line μfrom the return turbine T2 and intake turbine T3 that are mechanically connected to respective generators G (or motors functioning as generators).

Figure 15:
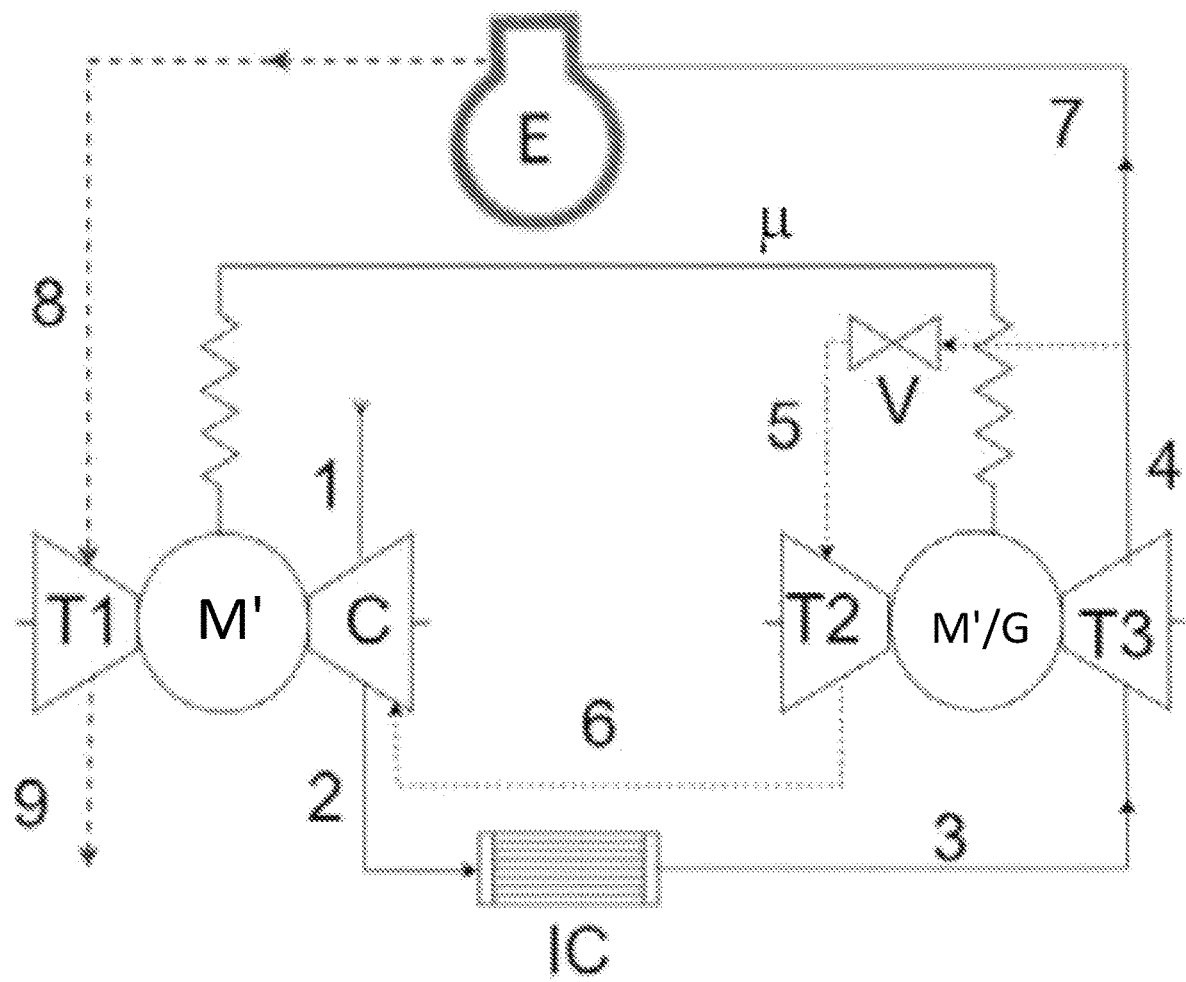

FIG. 15 shows the hot turbine T1 mechanically connected to a motor M' that is mechanically connected to the compressor C. The motor M' receives power via line μ from the return turbine T2 and intake turbine T3 that are both mechanically connected to a generator G (or a motor functioning as a generator).

Figure 16:
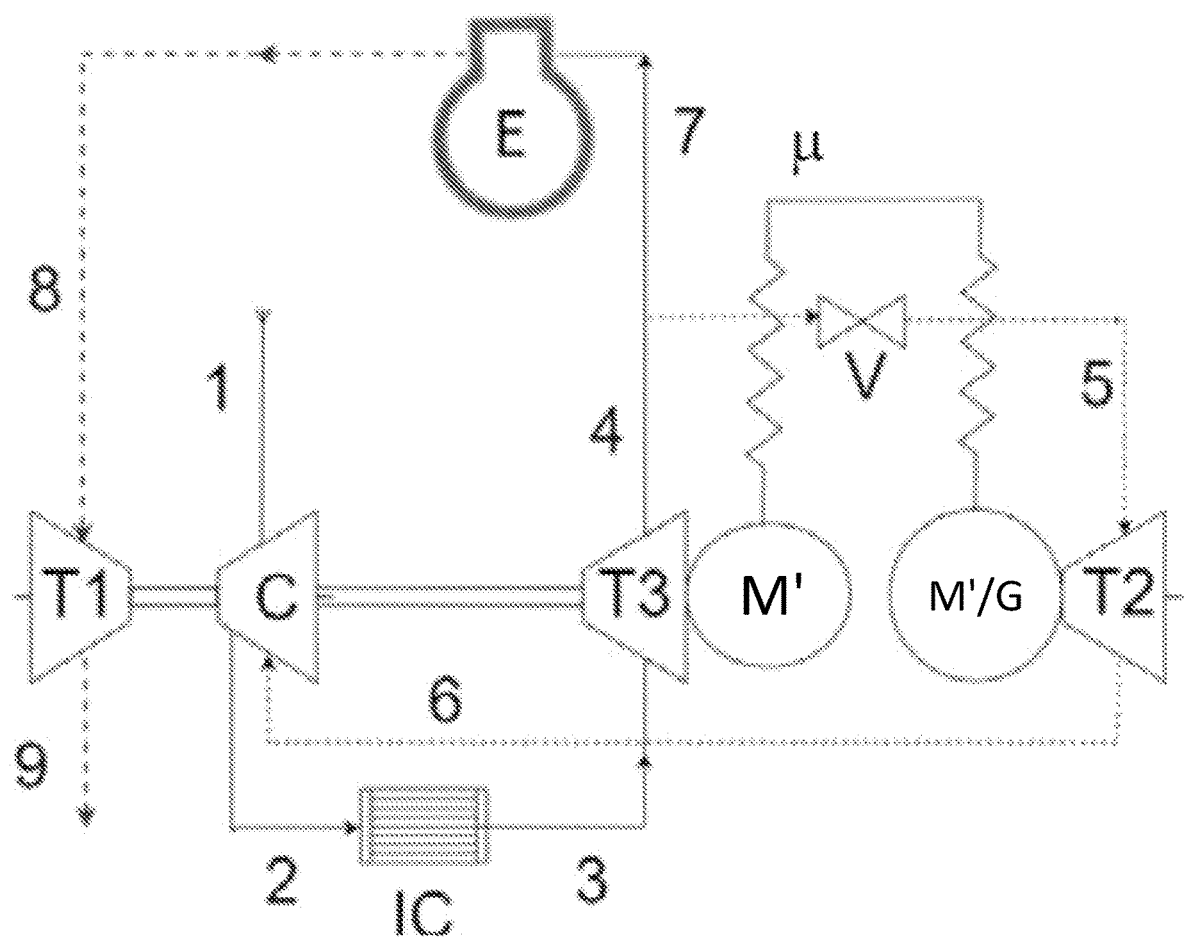

FIG. 16 shows exhaust or hot turbine T1 mechanically connected to the compressor C and to the intake or cold turbine T3 via a shaft. The cold turbine T3 is mechanically connected to a motor M' and receives power through line μ from the return turbine T2 that is mechanically connected to a generator G (or a motor functioning as a generator).

Figure 17:
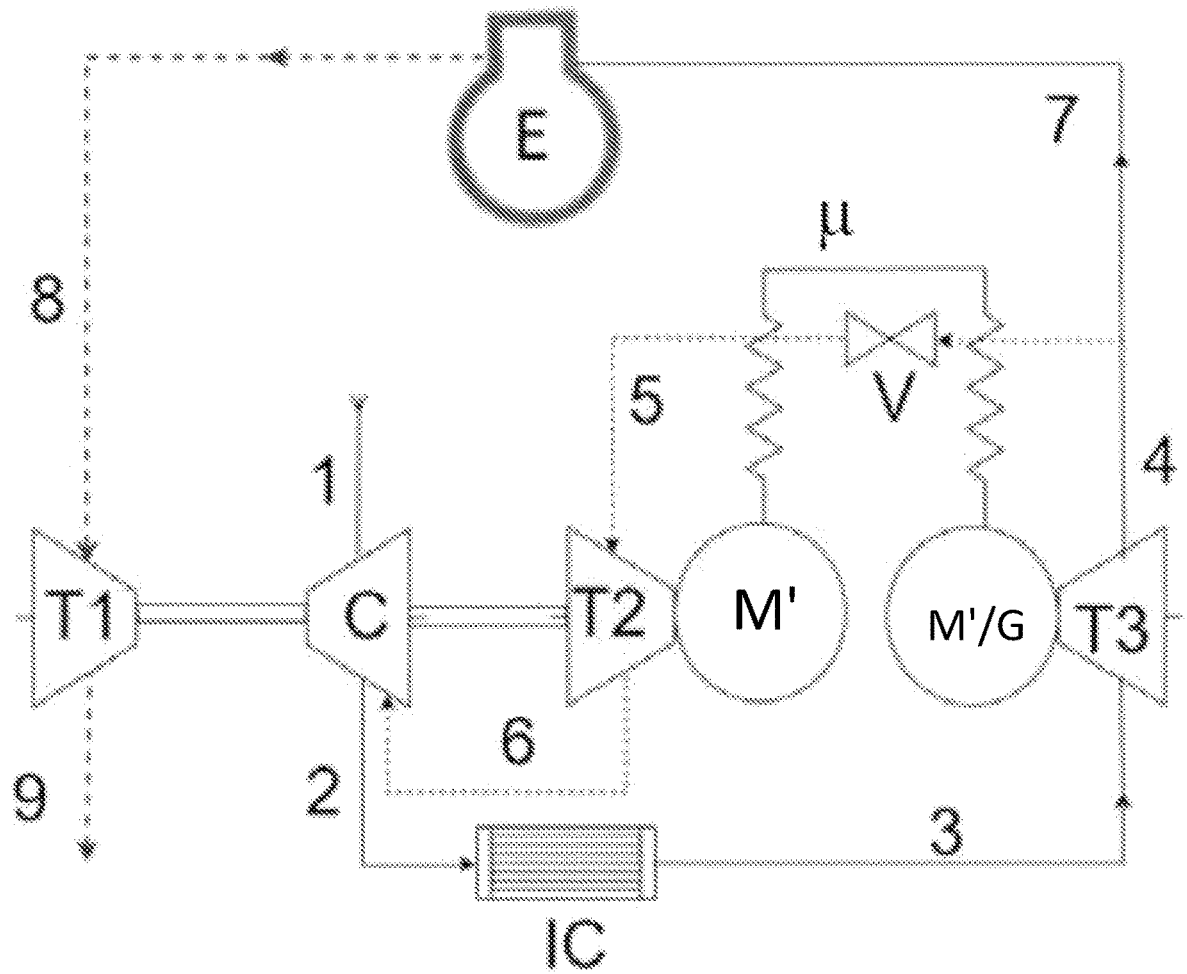

FIG. 17 shows exhaust or hot turbine T1 mechanically connected to the compressor C and to the return turbine T2 via a shaft. The return turbine T2 is mechanically connected to a motor M' and receives power through line u from the intake turbine T3 that is mechanically connected to a generator G (or a motor functioning as a generator).

Figure 18:
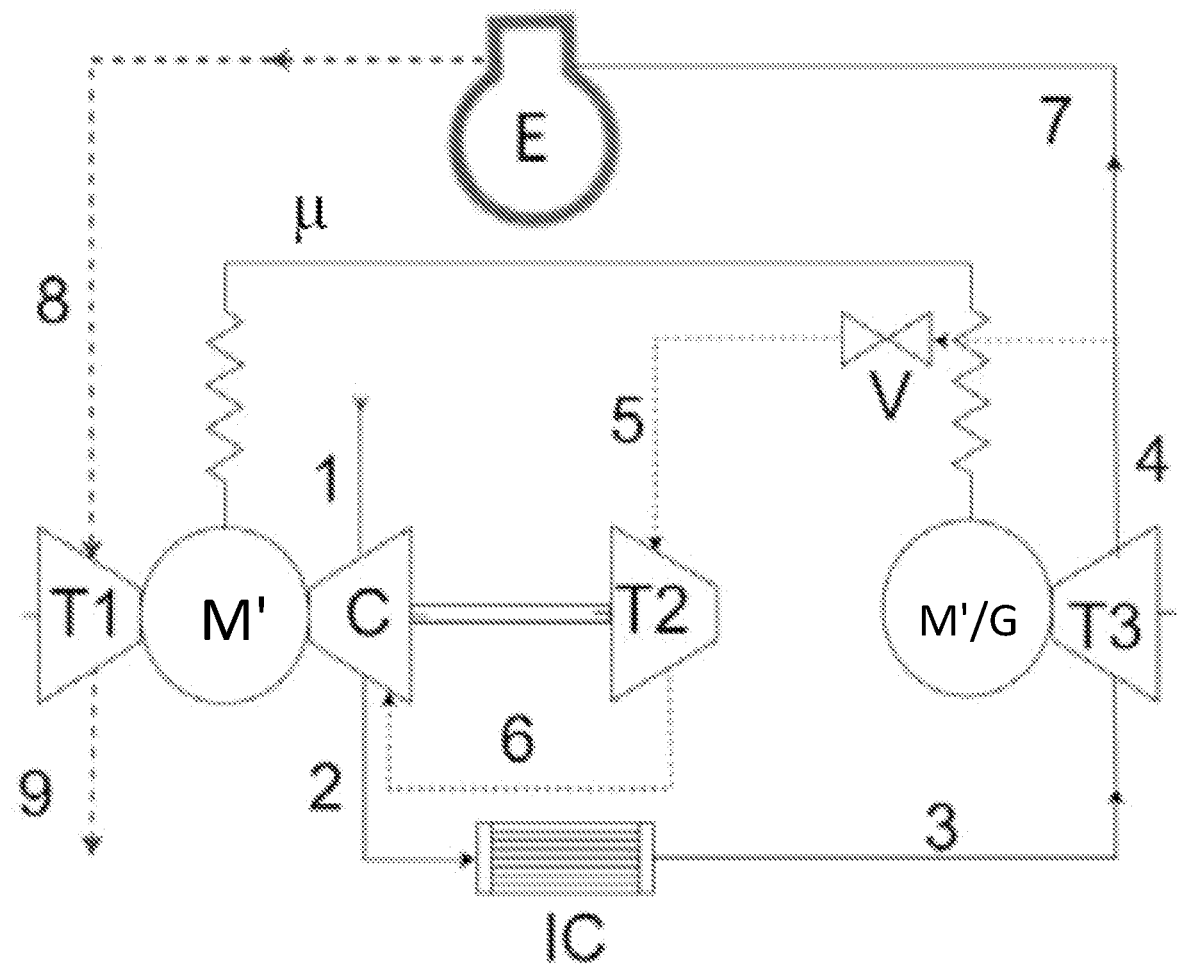

FIG. 18 shows hot turbine T1 mechanically connected to the compressor C and to the return turbine T2 via a shaft with a motor M' between the exhaust turbine T1 and the compressor C. The motor M' receives power through line u from the generator G (or a motor functioning as a generator) that is mechanically connected to a cold turbine T3.

Figure 19:
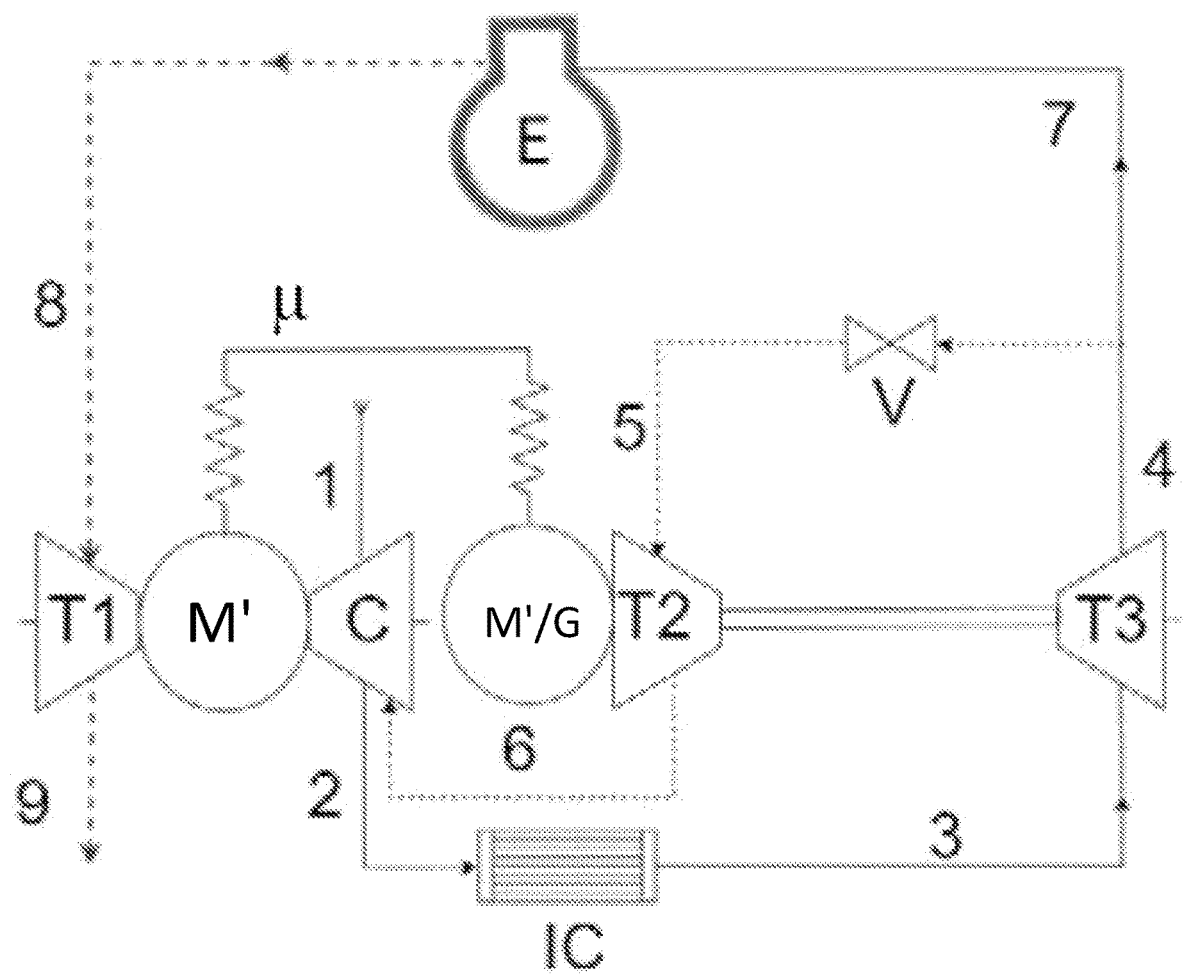

FIG. 19 shows the hot turbine T1 mechanically connected to the compressor via a shaft and having a motor M' between them. The motor M' receives power via line u from the generator G (or a motor functioning as a generator) that is mechanically connected to a turbine T3 that is also mechanically linked to the cold turbine T2.

Other features, interconnections and components of each arrangement described above are shown in the Figures.

Conclusion: Accordingly, the structural arrangement in a low-temperature turbocompressor for an internal combustion engine is based on novel functional and technical features, as can be seen from the attached figures and understood from the description, thereby qualifying for the claimed legal protection.

Many modifications and variations of the present invention are possible in light of the above teachings. It is, therefore, to be understood within the scope of the appended claims the invention may be protected otherwise than as specifically described.

We claim:

1. A low pressure turbo compressor arrangement for an internal combustion engine comprising;
   an exhaust gas turbine configured to receive exhaust gas from an internal combustion engine and to discharge the exhaust gas to an ambient environment;
   a compressor configured to receive and compress an ambient intake air stream and output a compressed air stream, wherein the compressor and the exhaust gas turbine are mechanically connected to a first motor;
   an intercooler coupled to an output of the compressor, wherein the intercooler is configured to receive the compressed air stream from the compressor and discharge a cooled compressed air stream;
   an air intake turbine configured to receive the cooled compressed air stream from the intercooler and to discharge an expanded cooled air stream to an internal combustion engine;
      a first generator mechanically connected to the air intake turbine; and,
   a relief valve in fluid communication with the expanded cooled air stream from the air intake turbine, wherein the relief valve discharges excess expanded cooled air stream.

2. The low pressure turbo compressor arrangement of claim 1 wherein the first motor is between the exhaust gas turbine and the compressor.

3. The low pressure turbo compressor arrangement of claim 1 further comprising a return turbine configured to receive the excess expanded cooled air stream from the relief valve and discharge the excess expanded cooled air stream to the compressor.

4. The low pressure turbo compressor arrangement of claim 3 further comprising a second generator mechanically connected to the return turbine.

5. The low pressure turbo compressor arrangement of claim 4 wherein the second generator is connected to the compressor and is between the compressor and the return turbine.

6. The low pressure turbo compressor arrangement of claim 4 wherein power from the first generator and the second generator is transferred to the first motor.

7. The low pressure turbo compressor arrangement of claim 3 wherein the return turbine is connected to the first generator.

8. The low pressure turbo compressor arrangement of claim 7 wherein the first generator is between the return turbine and the air intake turbine.

9. The low pressure turbo compressor arrangement of claim 1 wherein the first motor is an electrical motor.

10. The low pressure turbo compressor arrangement of claim 1 wherein the first motor is a hydraulic motor.

11. The low pressure turbo compressor arrangement of claim 1 wherein the first motor is a pneumatic motor.

12. The low pressure turbo compressor arrangement of claim 1 further comprising an internal combustion engine coupled to the arrangement.

13. The low pressure turbo compressor arrangement of claim 1 wherein the first generator is an electrical generator.

14. The low pressure turbo compressor arrangement of claim 1 wherein the first generator is a hydraulic generator.

15. The low pressure turbo compressor arrangement of claim 1 wherein the first generator is a pneumatic generator.

16. The low pressure turbo compressor arrangement of claim 1 wherein the first generator further comprises a second motor functioning as a generator.

17. A low pressure turbo compressor arrangement for an internal combustion engine comprising;
   an exhaust gas turbine coupled to a first shaft and configured to receive exhaust gas from an internal combustion engine and to discharge the exhaust gas to an ambient environment;
   a compressor coupled to the first shaft and configured to receive and compress an ambient intake air stream and output a compressed air stream;
   a first motor mechanically connected to the compressor;
   an intercooler coupled to an output of the compressor, wherein the intercooler is configured to receive the compressed air stream from the compressor and discharge a cooled compressed air stream;
   an air intake turbine configured to receive the cooled compressed air stream from the intercooler and to discharge an expanded cooled air stream to an internal combustion engine;
   a first generator mechanically connected to the air intake turbine;
   a relief valve in fluid communication with the expanded cooled air stream from the air intake turbine, wherein the relief valve discharges excess expanded cooled air stream;
      a return turbine configured to receive the excess expanded cooled air stream from the relief valve and discharge the excess expanded cooled air stream to the compressor; and,
      a second generator mechanically connected to the return turbine.

* * * * *